J. EGAN.
WRECKING TRUCK.
APPLICATION FILED DEC. 22, 1917.
Reissued Aug. 20, 1918.
14,506.
3 SHEETS—SHEET 1.
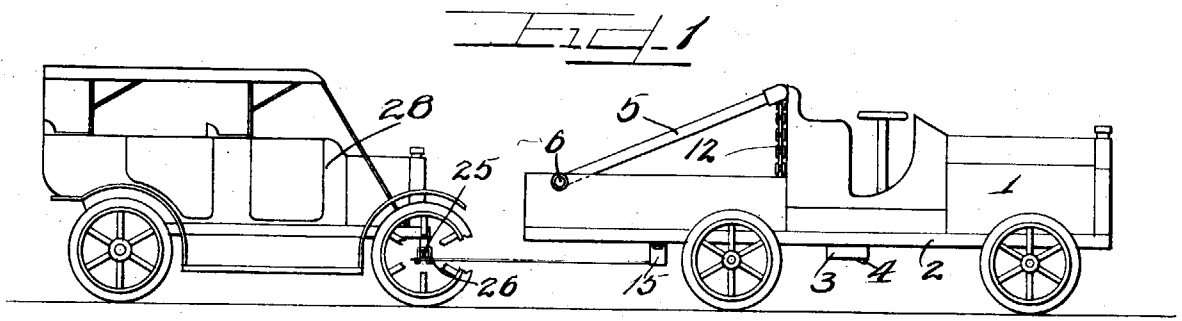
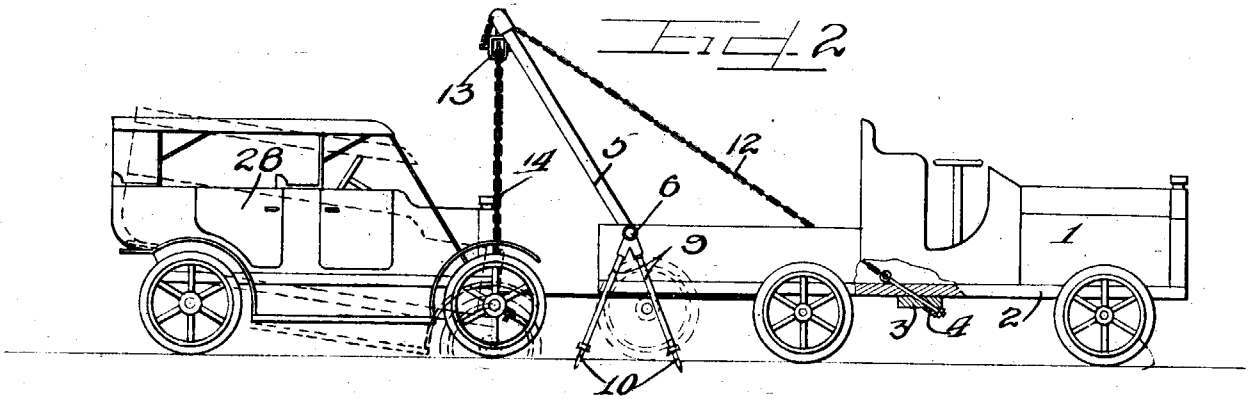
Witnesses
J. W. Angell
Charles Fielson
Inventor
James Egan
By Charles Wills Atty.

J. EGAN.
WRECKING TRUCK.
APPLICATION FILED DEC. 22, 1917.
Reissued Aug. 20, 1918.
14,506.
3 SHEETS—SHEET 2.
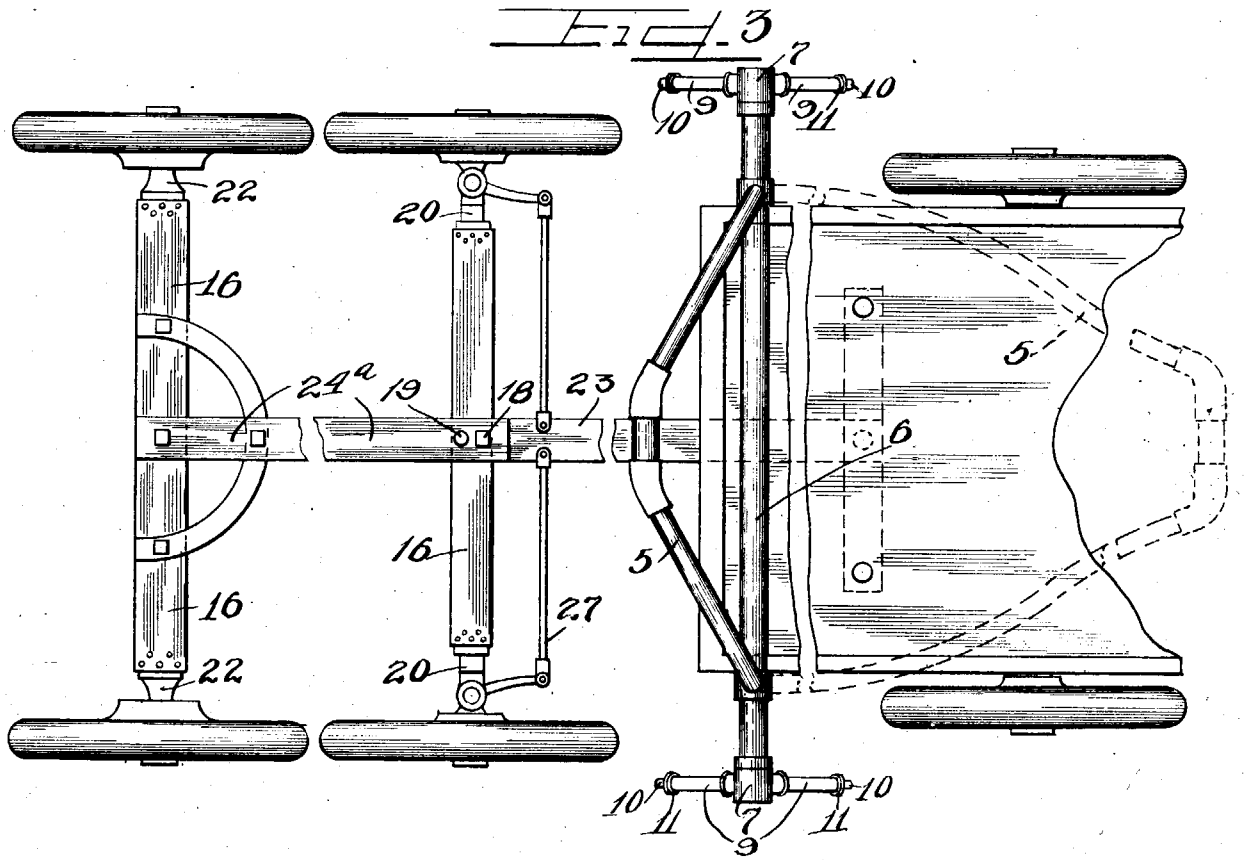
Witnesses
J. W. Angell
Charles Stillings.
Inventor
James Egan
By Charles Tilly Atty.

J. EGAN.

WRECKING TRUCK.

APPLICATION FILED DEC. 22, 1917.

Reissued Aug. 20, 1918.

14,506.

3 SHEETS—SHEET 3.

Witnesses

J. W. Angell

Charles W. Helm Jr.

Inventor

James Egan

By Charles W. Helm Atty.

UNITED STATES PATENT OFFICE.

JAMES EGAN, OF CHICAGO, ILLINOIS, ASSIGNOR TO EGAN WRECKING TRUCK COMPANY, A CORPORATION OF ILLINOIS.

WRECKING-TRUCK.

14,506. Specification of Reissued Letters Patent. Reissued Aug. 20, 1918.

Original No. 1,116,579, dated November 10, 1914, Serial No. 771,576, filed June 4, 1913. Application for reissue filed December 22, 1917. Serial No. 208,503.

*To all whom it may concern:*

Be it known that I, JAMES EGAN, a citizen of the United States, and a resident of the city of Chicago, in the county of Cook and State of Illinois, have invented certain new and useful Improvements in Wrecking-Trucks; and I do hereby declare that the following is a full, clear, and exact description of the same, reference being had to the accompanying drawings, and to the numerals of reference marked thereon, which form a part of this specification.

An adequate wrecking device adapted to travel over the highways has been a practical necessity with the recent wide and extensive use of automobiles. Heretofore, in the event of an accident to an automobile, causing a whole or partial demolition of the running gear, the wrecked vehicle has usually been mounted upon skids and dragged to a convenient place for repair or the disabled vehicle is sometimes hauled bodily onto a wagon by means of a windlass, and then carried to any place desired. In either case, such removal of the wrecked vehicle requires a great loss of time and in many cases such type of wagons are not available.

This invention relates to a self-propelled wrecking device adapted to carry therewith an auxiliary running gear adapted to receive practically any type of vehicle upon such running gear whereby said vehicle may be rapidly transferred to a place of repair in tow of the self-propelled wrecking means.

It is an object of this invention to provide a wrecking device equipped with suitable elevating mechanism and provided with an auxiliary running gear adapted to be attached beneath either end of a wrecked vehicle.

It is also an object of this invention to provide an elevating mechanism for a device of the class described wherein such elevating mechanism may be suitably braced by adjustable means contacting the ground but limited in its movement and guyed in position by a chain or cable connected to the frame of the wrecking device.

It is also an object of this invention to provide a device equipped with elevating mechanism and auxiliary running gear adapted to be placed beneath a wrecked vehicle, and means for suitably connecting said running gear to the disabled vehicle and to the wrecking vehicle to properly tow the wrecked vehicle to a place of repair.

It is also an object of this invention to provide in combination with a wrecking vehicle, an auxiliary running gear which may be connected thereto by means of a drawbar, either rigidly connected to the auxiliary running gear or pivotally connected therewith to steer the wheels thereof.

It is also an object of this invention to provide a self-propelled wrecking device equipped with a pivotally mounted A-frame adapted to be braced at its base by suitable detachable means adapted to bear against the ground, as well as a chain or cable or other means connected to the frame of the vehicle.

It is also an object of this invention to use in connection with a self-propelled wrecking vehicle, a plurality of auxiliary running gears adapted to be connected beneath either or both ends of a wrecked vehicle, and a plurality of drawbars adapted to be connected to the wrecked vehicle and to one of said auxiliary running gears, and to the wrecking vehicle to tow the wrecked vehicle to a place of repair.

It is also an object of this invention to provide a drawbar which may be pivotally connected to an auxiliary running gear to suitably steer the same in towing, and means for rigidly connecting said drawbar to said running gear if desired.

It is furthermore an object of this invention to provide in combination with a wrecking vehicle and elevating mechanism thereon, an auxiliary running gear rolled beneath the wrecking vehicle during the elevation of the disabled vehicle and adapted to be rolled beneath the latter to receive the same thereon.

It is finally an object of this invention to provide wrecking mechanism associated with a self-propelled vehicle, whereby a wrecked vehicle may be suitably mounted upon an auxiliary running gear and towed to a place desired in a short space of time.

The invention (in a preferred form) is illustrated in the drawings and hereinafter more fully described.

On the drawings:

Figure 1 is a side elevation of a wrecking vehicle towing a disabled automobile, the rear end of the latter being mounted upon an auxiliary running gear provided by the towing vehicle, and the front axle of the automobile connected to a drawbar pivoted on the towing vehicle.

Fig. 2 is a side elevation illustrating in dotted lines an automobile with the front wheels disabled, and with the elevating mechanism of the wrecking vehicle connected thereto to raise the same in the position shown in full lines for the insertion of an auxiliary running gear therebeneath.

Fig. 3 is a fragmentary top plan view of the auxiliary running gear for the front and rear end of a wrecked vehicle, and the relation thereto of the elevating mechanism for lifting the wrecked vehicle upon said auxiliary running gear.

As shown in the drawings:

Figure 8:
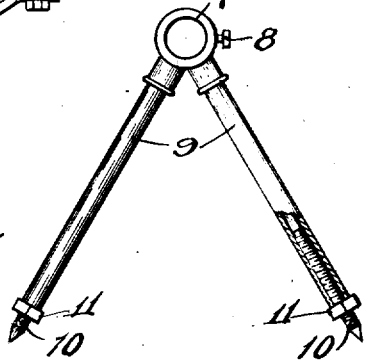
Fig. 8 is a front elevation illustrating the adjustable support for the base of the A-frame elevating mechanism.
Figure 6:
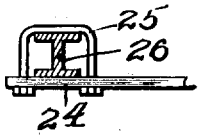
Fig. 6 is a fragmentary sectional detail illustrating U-bolt means for connecting a drawbar to the front axle of a disabled vehicle.

The reference numeral 1, indicates a self-propelled vehicle, although not necessarily so, across the side sill frame members 2 of which is rigidly bolted or otherwise secured a transverse anchor member 3, through which extends a bolt 4. An A-frame boom 5, is pivotally mounted in any suitable manner at the rear of the wrecking vehicle upon a transverse shaft 6, the extremities of which, as shown in Fig. 3, extend outwardly beyond the body of the wrecking vehicle to receive detachably thereon adjustable supporting legs which comprise a journal member 7, provided with a set screw 8, adapted to be slipped over the extended ends of the transverse shaft 6, as shown in Figs. 2 and 8, respectively.

Threaded into angular extensions of said journal member 7, are pipe or tube members 9, which at their lower ends receive therein the threaded spurs 10. A nut 11, is threaded upon each of said spurs 10, for the purpose of extending the same into an adjusted position, the nut bearing against the lower end of said tube members 9. The top of the A-frame boom 5, is connected to said bolt 4, by means of a flexible cable or chain 12, which may be adjustable to limit the outward movement of said A-frame boom 5, about its pivot shaft 6, but for convenience of illustration such adjusting means has been omitted, as obviously any conventional type of pawl and ratchet governed windlass mechanism may be used for the purpose.

A block and tackle 13, and 14, is swung from the upper end of said A-frame boom 5, for the purpose of attachment to either end of the disabled automobile to raise said respective end from the ground for a purpose hereinafter described. Conveniently mounted beneath the frame of said wrecking vehicle 1, at the rear thereof, is a bracket 15, which is apertured to receive therethrough a king bolt 16[a], whereby a drawbar may be pivotally connected thereto. The purpose of elevating one or both ends of a disabled vehicle as the case may be, is to permit insertion therebeneath of an auxiliary running gear, an independent gear being provided for each end of the vehicle, depending upon whether or not both the front and rear wheels of the same are out of commission.

Figure 4:
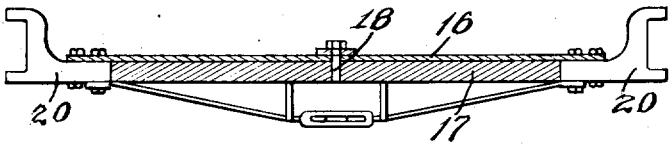
Fig. 4 is a central longitudinal section taken through the front axle of the auxiliary running gear.
Figure 5:
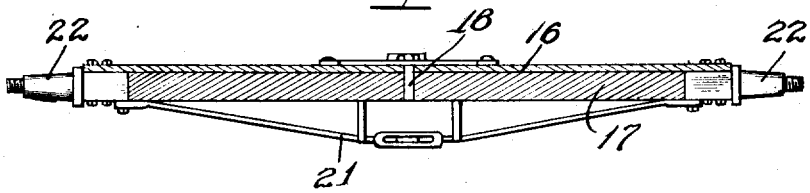
Fig. 5 is a similar section taken through the axle of the rear auxiliary running gear.
Figure 9:
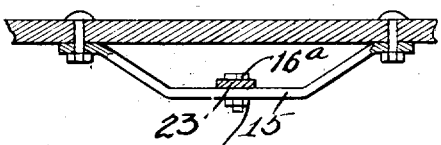
Fig. 9 is a detail of the bracket for the drawbar on the rear of the wrecking vehicle.

The auxiliary running gear for the front end of the disabled vehicle comprises an inverted channel 16, having a timber 17, fitted therewithin and centrally apertured to receive the bolt 18, and taper pin 19, therethrough and through a drawbar provided with suitable apertures to register therewith. As shown, the drawbar rests upon the upper portion of said inverted channel 16, so that if desired, a retaining nut such as B, shown upon the bolt 16[a], in Fig. 9, may be dispensed with, gravity serving to maintain the axle and drawbar suitably connected by means of said bolt and taper pin. The purpose of providing the taper pin 19, is to prevent pivotal movement of the drawbar relative to the axle, if desired.

Bolted in the ends of the axle afforded by said members 16 and 17, are steering knuckle brackets 20, and connected on the bolts securing the same to said axle members is a truss rod 21, thus affording a very substantial axle construction capable of supporting great weight. The axle for the rear auxiliary running gear is constructed in a like manner except that tapered axle stud shafts 22, are bolted in the ends of the axle in place of the steering knuckle brackets. Each of said axles is of a length to afford a wheel gage greater than the ordinary type of standard construction in order, if necessary, to cradle the end of the disabled vehicle upon the auxiliary axle, without necessitating the removal of the broken parts.

A plurality of drawbars is provided that serve in connection with the auxiliary running gears, one being denoted by a reference numeral 23, for towing the automobile when the front running gear is demolished, and the rear gear practically uninjured. Another towing drawbar 24, is provided having a plurality of apertures to receive therein a U-member 25, which extends around and over the regular automobile axle 26, to bind the drawbar rigidly thereto. The drawbar 23, used in connection with the front auxiliary axle of the running gear, has connected thereto the rods 27, of the steering mechanism, such that when the pivotal construction between said drawbar and axle is used a turning movement of the wrecking vehicle ahead of the vehicle being towed, will cause a movement of the steering knuckle to turn the wheels on the axle, thus enabling a short turn to be made, which greatly facilitates the towing.

A third drawbar 24[a], is provided to connect the front and rear running gears together when both the front and rear wheels of the automobile are damaged and in this case the towing drawbar 23, is used with the pivotal connection already described.

The operation is as follows:

As shown in Figs. 1 and 2, the disabled automobile is denoted by the reference numeral 28, and, as shown in Fig. 1, the rear running gear of the same has been demolished, and an auxiliary gear substituted therefor, elevation of the rear end of the automobile for such purpose having been effected by means of the elevating mechanism on the wrecking vehicle already described. The drawbar 24, is shown connected between the front axle of the automobile, and the rear of the wrecking vehicle, whereby the same may be easily towed to a place of repair. In Fig. 2, the dotted line position represents an automobile with the front running gear thereof demolished and the elevating mechanism upon the wrecking vehicle in operation to raise the automobile into the position shown in full lines in the aforesaid figure. When the automobile has been elevated to the proper height, the auxiliary front running gear, which is shown rolled beneath the rear end of the wrecking vehicle, this being a convenient position for the same during the elevation of the front end of the disabled automobile, is then rolled outwardly beneath the front end of the disabled automobile, and the automobile lowered thereon. In this case, the pivotal connection for the drawbar 23, is used, such that the wheels of said auxiliary front running gear may properly follow the path of the wrecking vehicle, as the disabled automobile is towed.

The drawbar 24[a], together with the towing drawbar 23, is used when the entire running gear of the automobile has been injured and both sets of auxiliary gears are used, thus affording a truck capable of being guided by the towing drawbar. It is obvious that when the elevating mechanism is in operation the principal forces applied thereto are tranferred and directed through the transverse pivotal shaft 6, to the supporting links at each extremity thereof, which, bearing firmly upon the ground, entirely relieve the wrecking vehicle of any stress except that due to the guy cable or chain 12. As shown in Fig. 1, the elevating mechanism when not in use may be swung inwardly and forwardly of the wrecking vehicle into a convenient position.

Figure 10:
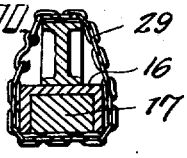
Fig. 10 is a transverse section taken through the axle of the auxiliary truck and the axle of the disabled vehicle mounted thereon, showing a manner in which they may be connected.
Figure 7:
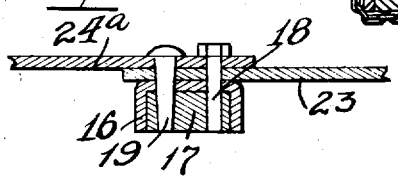
Fig. 7 is a fragmentary sectional detail illustrating the means of rigidly locking a pivotally connected drawbar to the axle of an auxiliary running gear.

It is to be noted that the top surface of the axles of the auxiliary running gears are relatively flat, thereby permitting the disabled vehicle to be easily supported thereon, the disabled vehicle axle resting upon the auxiliary running gear axle, and the two being bound together by a suitable chain 29, as illustrated in Fig. 10.

I am aware that the details of construction may be varied through a wide range without departing from the principles of this invention. I therefore do not purpose limiting the patent granted otherwise than necessitated by the prior art.

I claim as my invention:

1. In a device of the class described, a self-propelled wrecking vehicle, an auxiliary running gear normally towed at the rear of said wrecking vehicle, said auxiliary running gear adapted to be rolled from beneath the wrecking vehicle to a position beneath a disabled vehicle elevated by said wrecking vehicle, and a pivotally mounted drawbar connecting said running gear with the wrecking vehicle.

2. In a device of the class described, an overhanging wrecking vehicle, front and rear auxiliary gears normally towed at the rear of said overhanging vehicle adapted to be rolled from beneath said wrecking vehicle into position beneath a disabled vehicle, means connecting said front and rear running gears, and a pivotal steering connection between said front running gear and said wrecking vehicle.

3. In a device of the class described, the combination with a wrecking vehicle, of an auxiliary running gear adapted to be rolled beneath a disabled vehicle, means securing said running gear to said disabled vehicle, a bracket mounted on the wrecking vehicle, and a drawbar pivoted to said bracket connecting said running gear with said wrecking vehicle.

4. The combination with a wrecking vehicle having an elevating mechanism mounted thereon, of an auxiliary gear adapted to be normally towed at the rear of said wrecking vehicle, said auxiliary gear adapted to be rolled to a position beneath an elevated disabled vehicle, means for connecting said auxiliary gear with the disabled vehicle, and means affording a connection between the disabled vehicle and said wrecking vehicle so as to tow the former by the latter.

5. In a device of the class described, a wrecking vehicle, an auxiliary gear, said wrecking vehicle so constructed as to permit said auxiliary gear to be disposed therebeneath and adapted to be rolled beneath an elevated disabled vehicle, and a pivotal steering connection between said auxiliary gear and said wrecking vehicle.

6. In a device of the class described, a hoisting vehicle, an auxiliary gear, said vehicle constructed to permit said gear to be normally towed at the rear of the frame to be rolled into position beneath a disabled vehicle when the same is hoisted, and a pivotal drawbar connection between said hoisting vehicle and said running gear to steer the latter to permit short turning of the combined vehicle and auxiliary gear.

In testimony whereof I have hereunto subscribed my name in the presence of two subscribing witnesses.

JAMES EGAN.

Witnesses:
CHARLES W. HILLS, JR.,
EARL M. HARDINE.